United States Patent
Suzuki et al.

(10) Patent No.: US 6,572,236 B2
(45) Date of Patent: Jun. 3, 2003

(54) BACK LIGHT UNIT, LIQUID CRYSTAL DISPLAY, AND METHOD FOR MANUFACTURING LIGHT GUIDE PLATE

(75) Inventors: Masaru Suzuki, Kanagawa (JP); Yoshihiro Katsu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/826,340

(22) Filed: Apr. 4, 2001

(65) Prior Publication Data

US 2001/0036068 A1 Nov. 1, 2001

(30) Foreign Application Priority Data

Apr. 26, 2000 (JP) .................................. 2000-126706

(51) Int. Cl.[7] .......................... F21V 8/00; G02F 1/1335
(52) U.S. Cl. ........................ 362/31; 362/330; 362/561; 349/65
(58) Field of Search .................. 349/61–65; 362/31, 362/330, 339, 558, 561

(56) References Cited

U.S. PATENT DOCUMENTS 3,727,042 A * 4/1973 Evans .......................... 362/31
5,600,455 A * 2/1997 Ishikawa et al. ............... 362/31
5,716,681 A * 2/1998 Williams ...................... 349/64
5,997,148 A * 12/1999 Ohkawa ....................... 362/31
6,406,160 B1 * 6/2002 Itoh ............................ 362/31

FOREIGN PATENT DOCUMENTS

| JP | 07-051008 | 3/1995 |
| JP | 07-106468 | 4/1995 |
| JP | 07-239483 | 9/1995 |
| JP | 08-035465 | 1/1996 |

* cited by examiner

*Primary Examiner*—Alan Cariaso
(74) *Attorney, Agent, or Firm*—Andrew J. Wojnicki, Esq.; Kevin P. Radigan, Esq.; Heslin Rothenberg Farley & Mesiti P.C.

(57) ABSTRACT

To provide a back light unit, a liquid display, and a method for manufacturing a light guide plate, in which the occurrence of bright lines can be diminished. An incoming surface 11a of a transparent light guide plate 11 is machined into a smooth surface S to correct a manufacturing tolerance during injection molding in order to form an edge portion E into a designed shape. To effectively reduce occurrence of bright lines, the edge portion E preferably has a curvature of radius or a chamfer dimension of 140 [μm] or smaller. The transparent light guide plate 11, a diffusion sheet 5, and a prism sheet 12 configure a back light unit 10 for a liquid crystal display.

7 Claims, 16 Drawing Sheets

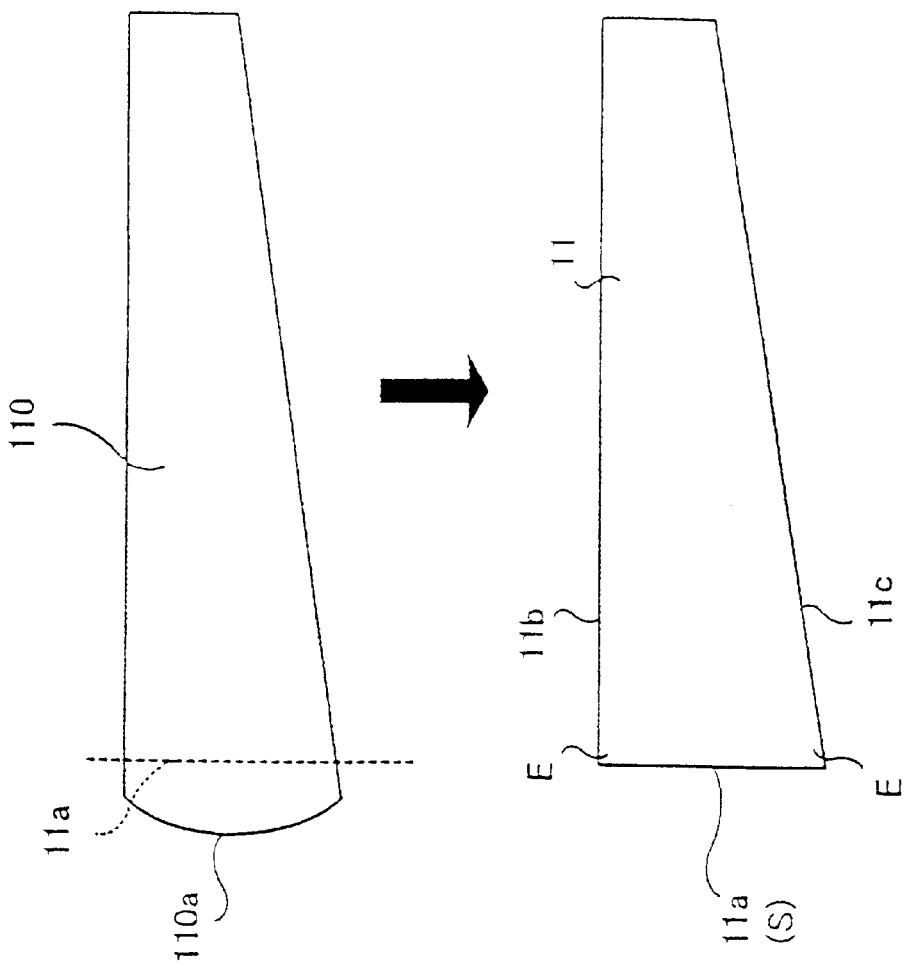

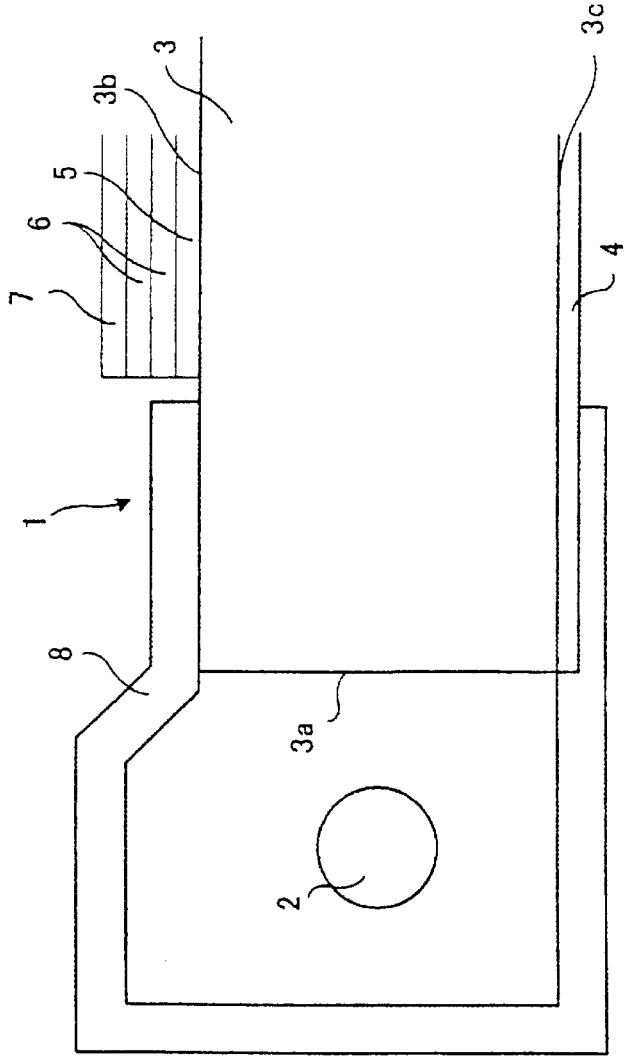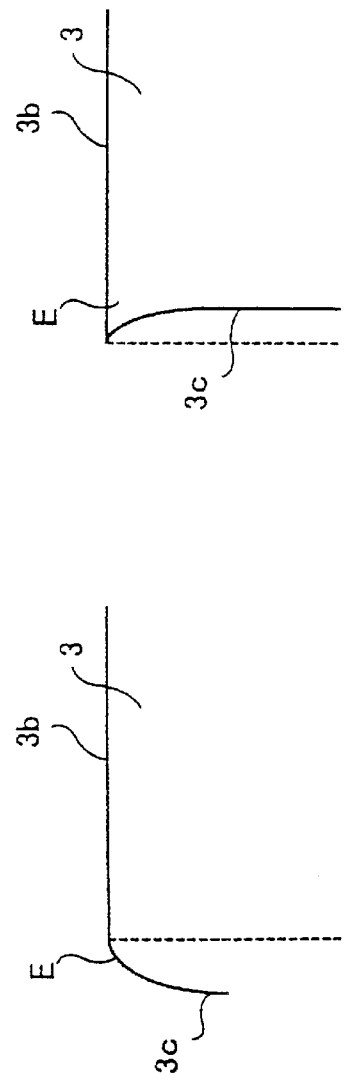
Figure 13a
Figure 13b
Figure 13c

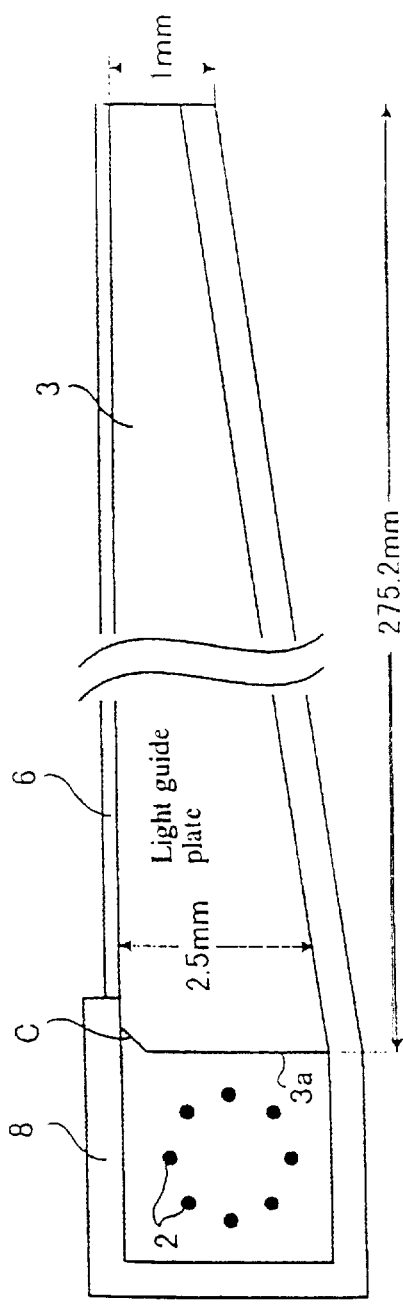
Figure 15a
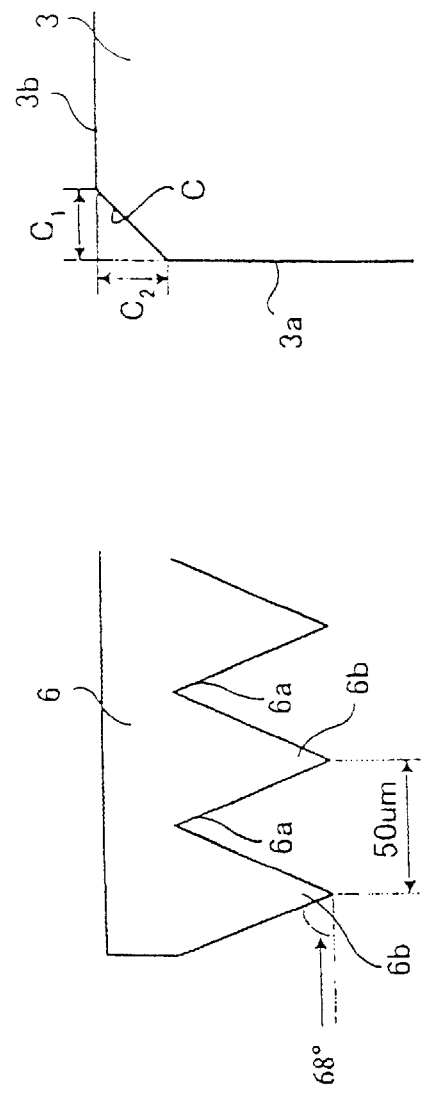
Figure 15b
Figure 15c

BACK LIGHT UNIT, LIQUID CRYSTAL DISPLAY, AND METHOD FOR MANUFACTURING LIGHT GUIDE PLATE

PRIOR FOREIGN APPLICATION

This application claims priority from Japanese patent application number 2000-126706, filed Apr. 26, 2000, which is hereby incorporated herein by reference in its entirety.

TECHNICAL FIELD

The present invention relates to a back light unit for use in a liquid crystal monitor or the like, a liquid crystal display, and a method for manufacturing a light guide plate.

BACKGROUND ART

Liquid crystal displays are widely spread as image display devices for personal computers and various other monitors. Liquid crystal displays of this kind generally comprise a back light, planar light source for illumination, on a rear surface of a liquid crystal display panel to apply light to a liquid crystal surface with a predetermined spread in a fashion providing a uniform brightness, thereby visualizing images formed on the liquid crystal surface.

Such a back light uses a fluorescent lamp with a hot or cool cathode as a light source and must irradiate the overall surface of the liquid crystal display panel with light from what is called a linear light source comprising such a fluorescent lamp. Thus, the back light conventionally uses two methods, that is, a direct-light type and a side light type (an edge light type). The direct-light type has the fluorescent lamp placed immediately below the liquid crystal display panel and a uniformity plate and a diffusion plate installed thereon. On the other hand, the side light type has the fluorescent lamp installed on two sides or one side of a light guide plate made of a transparent resin so that light incident on the light guide plate is directed toward a liquid crystal display panel surface by means of a reflection section formed on a rear surface of the light guide plate; the light is then diffused into a uniform planar light.

The side light type back light may be thinner than the direct-light type back light and is thus suitable for display devices for portable equipment such as notebook computers.

FIG. 13a shows an example of the side light type back light. As shown in this figure, the back light 1 comprises a lamp 2 comprising a fluorescent lamp and acting as a light source, and a light guide plate 3. The light guide plate 3 has an incoming surface 3a opposed to the lamp 2 and on which light from the lamp 2 is incident, an outgoing surface 3b that faces a liquid crystal display panel (not shown) and from which planar light is emitted, and an opposed surface 3c that is opposed to the outgoing surface 3b.

The opposed surface 3c has, for example, dot-like printing (not shown) applied thereto as the reflection section for reflecting light. A reflection sheet 4 is disposed on the opposed surface 3c, and a diffusion sheet (whose functions are to diffuse the light and to suppress bright lines) 5, one or more prism sheets 6, a prism protective sheet 7, and the like are laminated on the outgoing surface 3b. Furthermore, a metal reflector 8 is provided on the opposed surface 3c of the light guide plate 3 to reflect light.

In the light guide plate 3, light from the lamp 2 which is incident from the incoming surface 3a essentially advances toward a side end surface on the other end side while being totally reflected in the interior of the light guide plate 3. When, however, the light impinges on the dot-like printing or the like applied to the opposed surface 3c, the total reflection is compromised due to diffused reflection. Due to the reflection sheet 4 on the opposed surface 3c of the light guide plate 3, the diffused-reflected light is emitted from the outgoing surface 3b of the light guide plate 3. The dot-like printing or the like applied to the opposed surface 3c has coarser dots near the incoming surface 3a and denser dots on the other end side, in order to allow light to be uniformly emitted from the outgoing surface 3b (that is, to obtain a uniform luminance distribution).

Although attempts have been made to make the emitted light uniform by applying the dot-like printing to the light guide plate 3 as described above, bright lines K may occur on a screen, particularly near the lamp 2, as shown in FIG. 14. The bright lines K occur when a series of high luminance portions each extending linearly in parallel with the lamp 2 alternate with a series of low luminance portions each extending linearly.

Attempts have been made to find the causes of the occurrence of the bright lines K, and several occurrence mechanisms have been found which are based on a structure near the lamp 2; that is, action has been taken to individual causes. In fact, however, the occurrence of the bright lines K has not completely been clarified yet and is still one of the problems to be solved by those skilled in the art.

SUMMARY OF THE INVENTION

It is thus an object of the present invention to provide a back light unit, a liquid display device, and a method for manufacturing a light guide plate in which the occurrence of the bright lines can be diminished.

Then, the inventors examined the bright line mechanisms to obtain the knowledge that an edge portion formed between the incoming surface 3a of the light guide plate 3 and the outgoing surface 3b or the opposed surface 3c is formed into shapes different from an originally designed one after molding, that is, manufacturing tolerance during molding contributes to the occurrence of the bright lines K.

That is, the light guide plate 3 is generally formed by injection-molding an acrylic resin or the like, and the inventors assume that after molding, an edge portion E is curled as if chamfered (the example in FIG. 13b) or is thinned (the example in FIG. 13c), compared to a predetermined designed angle. Such a phenomenon is assumed to occur if during the injection molding, a resin material cannot fill every corner of the die due to its insufficient filling capability or the like, resulting in "short mold."

Under this assumption, the inventors manufactured the light guide plate 3 having an intentionally chamfered portion C on the incoming surface 3a, as shown in FIGS. 15a–c, as a case corresponding to, for example, the example shown in FIG. 13b (the example with the shape likened to have been chamfered), and used this light guide plate 3 to carry out an optical path simulation. That is, if the edge portion E of the light guide plate 3 is formed into a predetermined shape that is subjected to no chamfering or the like, no bright line K occurs theoretically; thus, in this simulation, the chamfered position C was formed on the edge portion to determine whether or not the bright lines K occur.

Only the prism sheet 6 was disposed on the outgoing surface 3b of the light guide plate 3 in order to eliminate other factors of the occurrence of the bright lines K. As shown in FIG. 15b, the prism sheet 6 has recesses 6a and projections 6b alternately and continuously formed on a bottom surface thereof at pitches of 50 [μm] and having substantially triangular cross section a vertex of which has an angle of 68 [°]. In addition, as shown in FIG. 15c, the chamfered portion C formed on the light guide plate 3 forms an angle of 45 [°] relative to the incoming surface 3a and the outgoing surface 3b and has a chamfer dimension $C_1$, $C_2$ of 0.1 [mm]. As shown in FIG. 15a, in respect of the lamps 2, eight point light sources are arranged at equal intervals on a circumference of an imaginary circle of diameter 2 mm drawn in the center of the light guide body.

Then, the lamps 2 were lighted under the above described conditions to observe the intensity of light on a front surface of the prism sheet 6. The surface of the prism sheet 6 was partitioned into 1000 portions between the incoming surface 3a of the light guide plate 3 and the opposite end, so that the intensity of light was measured for each partition.

FIG. 16 shows the results of observation of the first to 100th partitions relative to the incoming surface 3a of the light guide plate 3. The axis of abscissa indicates the position (distance) relative to the end side, while the axis of ordinate indicates the integrated value of the amount of light emitted at an angle between 80 and 100 [°] (the unit is lumen).

As is apparent from this figure, the results of the simulation show intense light at substantially equal pitches: 4.1 mm, 9.1 mm, 13.2 mm, and 18.2 mm. That is, the results of the simulation indicate that when the light guide plate 3 has the chamfered portion C formed therein, the bright lines K are observed on the outgoing surface 3b.

Thus, the light guide plate 3 manufactured under the above described conditions was used to actually produce a liquid crystal display, which was then measured for the luminance on a screen. FIG. 17 shows the results of the measurements, where the axis of abscissa indicates the position (distance) on the screen relative to the lamp (2) side, while the axis of ordinate indicates the integrated value of the amount of light emitted.

As is apparent from the results of the measurements, a periodic occurrence of the bright lines K was observed in the actual liquid crystal display using the light guide plate 3 with the chamfered portion C formed therein.

As described above, the inventors have found that the bright lines are caused by a failure to accurately reproduce a shape of the edge portion of the light guide plate originally designed during injection molding, that is, what is called manufacturing tolerances.

A back light unit according to the present invention based on this knowledge comprises a light guide plate for guiding light incident from an incoming surface thereof to an outgoing surface thereof to emit it as planar light, a reflection sheet located on a surface of the light guide plate which is opposed to the outgoing surface, a diffusion sheet for diffusing the planar light from the outgoing surface of the light guide plate, and a prism sheet having a prism surface for partly returning the light emitted from the outgoing surface of the light guide plate, from the outgoing surface to an interior of the light guide plate for diffusion, wherein an edge portion formed between the incoming surface of the light guide plate and at least one of the outgoing surface and the opposite surface has a radius of curvature or a chamfer dimension of 140 μm or smaller. Furthermore, as a specific configuration of the prism sheet, the prism sheet has the prism surface opposite to the light guide plate.

The light guide plate is preferably formed of an acrylic resin of a high light transmissivity which is represented, for example, by polymethylmethacrylate (a refractive index of 1.49 and a critical reflection angle of 42°) and specifically an acrylic-based monomer or comonomer.

The "radius of curvature" or "chamfer dimension" of the edge portion of the light guide plate is obtained by measuring the light guide plate on a cross section orthogonal with the incoming surface. Furthermore, the term "chamfering" refers to providing a corner between surfaces with inclination or roundness, and the chamfer dimension corresponds to the distance between a position where an extension of the incoming surface intersects an extension of the outgoing surface and a position on the incoming or outgoing surface which is chamfered (see the dimension $C_1$, $C_2$ in FIG. 6).

According to an aspect of the present invention, the edge portion is not positively subjected to chamfering in order to obtain the above described dimension. Thus, according to the spirits of the invention, once a transparent light guide plate has been molded or produced by means of predetermined machining after molding, the edge portion need not be formed of a surface having the same continuous radius of curvature or the chamfer dimension $C_1$, $C_2$ of the incoming and outgoing surfaces need not be totally the same. The radius of curvature and the chamfer dimension have only to be within a range such as that shown above.

According to an aspect of the present invention, by setting the radius of curvature or chamfer dimension of the edge portion of the light guide plate equal to 140 μm or smaller, light reflection conditions are prevented from differing from originally designed ones at the edge portion of the light guide plate to allow light incident from the incoming surface to be uniformly emitted from the outgoing surface, thereby reducing the occurrence of the bright lines.

Furthermore, by combining this light guide plate with the diffusion sheet and the prism sheet, planar light from the light guide plate can be diffused to further effectively reduce the occurrence of the bright lines.

Alternatively, if the radius of curvature or chamfer dimension of the edge portion of the light guide plate is set equal to 10 μm or more, when a reflector is installed in the light guide plate while assembling the back light using the light guide plate, the edge position can be prevented from being caught in the reflector.

Alternatively, an aspect of the present invention provides a back light unit for guiding light from a light source to apply it to a liquid crystal panel as planar light, the back light unit comprising a light guide plate including an incoming surface on which light from the light source opposed to the light guide plate is incident and which is formed of a machined surface, and an outgoing surface from which the light incident from the incoming surface is emitted as planar light, a sheet-shaped diffusion member having a diffusion member for diffusing light, and a sheet-shaped prism member having recesses and projections opposite to the light guide plate. In this manner, when the incoming surface of the light guide plate is formed of a machined surface obtained using a tool such as an end mill or a milling cutter, if during the molding of the light guide plate, "short mold" or the like results in a manufacturing tolerance with respect to the original design to, for example, thin or curl the edge portion, then this can be corrected to obtain the designed shape. As a result, the light incident from the incoming surface can be uniformly emitted from the outgoing surface, thereby reducing the occurrence of the bright lines.

In addition, the back light unit according to the present invention having the incoming surface of the light guide plate formed of a machined surface can be characterized in that an edge portion between the incoming surface of the light guide plate and the outgoing surface and between the incoming surface of the light guide plate and a surface opposed to the outgoing surface has a radius of curvature or a chamfer dimension of 140 μm or smaller.

According to another category of the present invention, the present invention can be considered to provide a liquid crystal display. The liquid crystal display according to an aspect of the present invention comprises a liquid crystal display panel for displaying images and a back light unit provided on a rear surface of the liquid crystal display panel for irradiating the liquid crystal display panel with light, and wherein the back light unit comprises a light source for applying light, a light guide plate having an incoming surface opposed to the light source and an outgoing surface facing the liquid crystal display panel and in which an edge portion between the incoming surface and the outgoing surface and between the incoming surface and a surface opposed to the outgoing surface has a radius of curvature or a chamfer dimension of 140 μm or smaller, and a bright line occurrence restricting sheet for restricting occurrence of bright lines caused by planar light emitted from the outgoing surface of the light guide plate. Furthermore, in another embodiment, the incoming surface of the light guide plate is machined.

According to such a liquid crystal display, the edge portion has a radius of curvature or a chamfer dimension within a predetermined dimensional range, and the bright line occurrence restricting sheet allows the light incident from the incoming surface of the light guide plate to be uniformly output from the outgoing surface, thereby reducing bright lines that may occur on the screen of the liquid crystal display.

The bright line occurrence restricting sheet may comprise the diffusion sheet, the prism sheet, or the like as appropriate, or of course a combination of the diffusion plate and the prism sheet or a plurality of prism sheets.

Alternatively, the present invention can be considered to provide a method for manufacturing a light guide plate. That is, an aspect of the present invention provides a method for manufacturing a light guide plate including an incoming surface on which light emitted from a light source is incident, the method comprising obtaining a light-conductive material by means of injection molding and using machining means to machine an incoming surface of the light guide plate material in order to obtain the light guide plate. This method can also comprise that during the machining of the incoming surface, an edge portion located between the incoming surface and a surface adjacent to the incoming surface is machined to have a radius of curvature or a chamfer dimension of 140 μm or smaller. The light guide plate obtained using this method enables the configuration of a back light unit or liquid crystal display that enables the light incident from the incoming surface of the light guide plate to be uniformly emitted from the outgoing surface.

The present invention can further be considered to provide a method for manufacturing a light guide plate. That is, an aspect of the present invention provides a method for manufacturing a light guide plate for emitting light incident from an incoming surface, from an outgoing surface as planar light, the method comprising a die formed such that an edge portion between the incoming surface and the outgoing surface and between the incoming surface and an opposed surface opposed to the outgoing surface has a radius of curvature or a chamfer dimension of 140 μm or smaller, and in that the die is used to injection-mold the light guide plate. By using this die to injection-mold the light guide plate, the light guide plate formed has a radius of curvature or a chamfer dimension of 140 μm or smaller in its edge portion. The light guide plate obtained using this method enables the configuration of a back light unit or liquid crystal display that enables the light incident from the incoming surface of the light guide plate to be uniformly emitted from the outgoing surface.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 4a–4b are process diagrams showing a method for manufacturing a light guide plate according to the present embodiment;

FIG. 13a is an explanatory drawing showing a back light unit constituting a conventional liquid crystal display;

FIGS. 13b–13c are views showing how an edge portion of a light guide plate is shaped after injection molding;

FIGS. 15a–15c are views useful for explaining a conventional light guide plate and a prism sheet used for a bright line occurrence simulation;

BEST MODE FOR CARRYING OUT THE INVENTION

Figure 1:
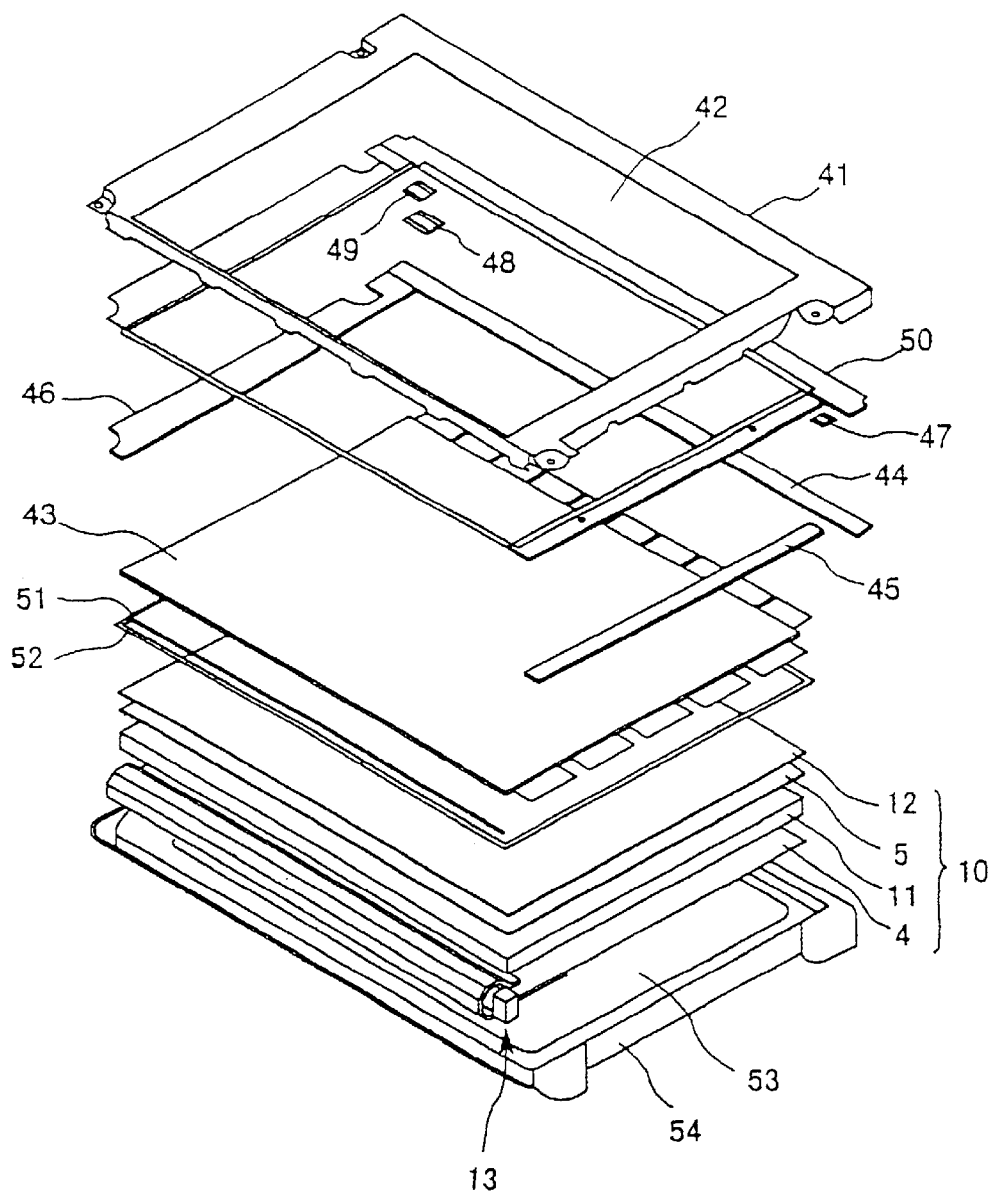
FIG. 1 is a perspective view useful for explaining the configuration of a liquid crystal display according to the present embodiment.

The present invention will be described below in detail with reference to the accompanying drawings showing embodiments. In the following description, the same parts of the configuration as in the configuration shown in FIG. 13 are denoted by the same reference numerals and description thereof is thus omitted.

FIG. 1 is a perspective view useful for explaining the entire configuration of a liquid crystal display according to this embodiment. Reference numeral 41 denotes a metal shield case for forming an upper frame, the shield case forming a display window 42 defining an effective screen of a liquid crystal display module. Reference numeral 43 denotes a liquid crystal display panel comprising two glass substrates between which TFTs having source and drain electrodes, gate electrodes, amorphous silicon layers, and the like formed thereon, color filters, and the like are laminated. A drain circuit substrate 44, a gate circuit substrate 45, and an interface circuit substrate 46 are formed above the liquid crystal display panel 43, and joiners 47, 48, 49 are provided to connect the circuit substrates together. These circuit substrates 44, 45, 46 are fixed to the shield case 41 via an insulating sheet 50.

On the other hand, a light blocking spacer 52 is provided below the liquid crystal display panel 43 via a rubber cushion 51, and a back light unit 10 is provided below the light blocking spacer 52 to irradiate the liquid crystal display panel 43 with planar light.

Figure 2:
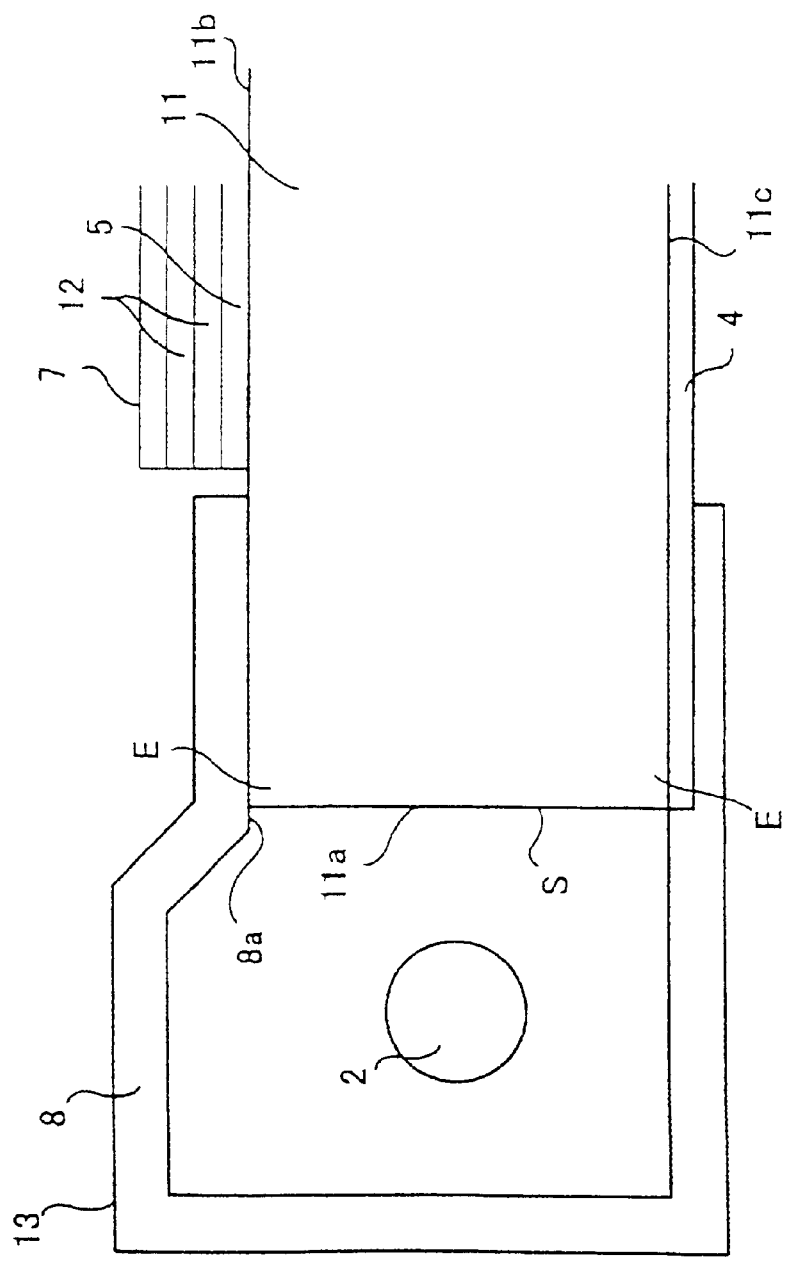
FIG. 2 is a side view showing a part of a back light unit constituting the liquid crystal display.

FIG. 2 is a sectional view showing the configuration of the back light unit 10. As shown in FIGS. 1 and 2, the back light unit 10 comprises a transparent light guide plate (light guide plate) 11, a diffusion sheet 5 provided on a front surface of the light guide plate, for example two overlapping prism sheets (prism members or bright line suppression sheets) 12, a prism protective sheet 7 (shown only in FIG. 2), and a reflection sheet 4 provided below the transparent light guide plate 11. Furthermore, the transparent light guide plate 11 has a lamp unit 13 provided on one side thereof. In addition, as shown in FIG. 1, a lower case 54 having an opening 53 is provided below the reflection sheet 4.

The diffusion sheet 5 has a function for diffusing light from the light guide plate, described later, in order to obtain a uniform planar light. The diffusion sheet 5 comprises a sheet-shaped base material comprising, for example, polyethyleneterephthalate (PET) and having acrylic beads of diameter between, for example, about 30 and 50 $\mu$m disposed on a front surface thereof as a diffusion material so that recesses and projections on the surface of the diffusion sheet 5 which are formed by the acrylic beads can provide a diffusion effect. The diffusion sheet 5 comprises a sheet-shaped base material comprising, for example, polycarbonate (PC) and having acrylic beads of diameter between, for example, about 30 and 50 $\mu$m kneaded thereinto as a diffusion material so that a difference in refractive index between the base material (polycarbonate) and the kneaded acrylic beads results in a diffusion effect.

Figure 3A:
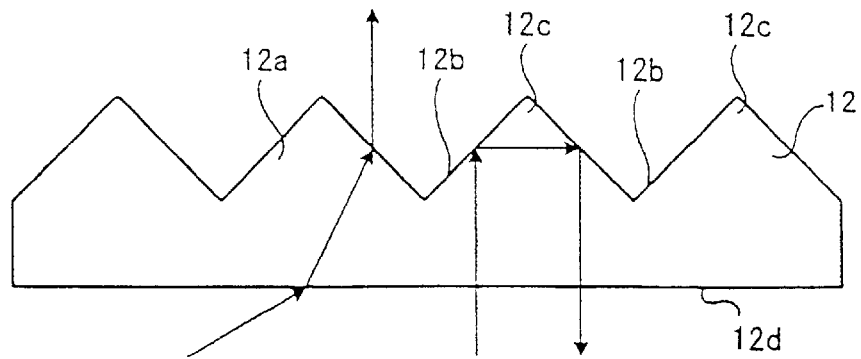
FIGS. 3a–3b are explanatory drawings useful for comparing an upper prism sheet with a lower prism sheet both provided in the back light unit.
Figure 3B:
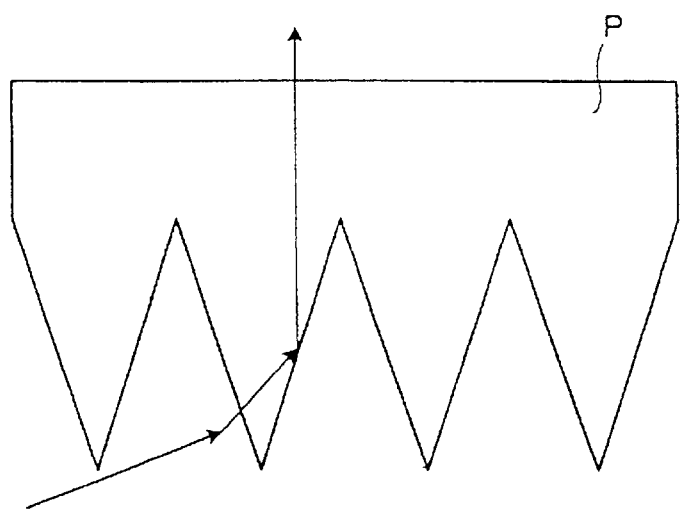

In addition, the prism sheet 12 is used to increase luminance at a front surface of the back light unit. As shown in FIG. 3a, the prism sheet 12 is of what is called an "upward type" having recessed grooves 12b and projecting grooves 12c alternately formed on a top surface thereof as a diffusion prism surface (a prism surface, a recess and projection section) 12a. As shown in FIG. 3a, in the upward prism sheet 12, light obliquely incident from a bottom surface 12d is emitted from the top surface, while light incident from the bottom surface substantially perpendicularly thereto is reflected inside the prism sheet 12 and emitted from the bottom surface 12d toward the transparent light guide plate 11 again, thereby forming a new light source. At this point, the light is diffused to make leakage difficult to view. On the contrary, as shown in FIG. 3b, in a downward prism sheet P, light incident from its bottom surface side (light guide plate side) is all emitted from its top surface, whereby the diffusion effect is unlikely to be obtained.

The reflection sheet 4 is configured to reflect light incident on the transparent light guide plate 11 from the lamp unit 13, toward a liquid crystal display panel 43. The reflection sheet 4 may be white or be made of metal such as silver or aluminum or coated with such metal.

Additionally, the lamp unit 13 comprises a lamp (a light source) comprising a fluorescent lamp and a reflector 8 made of metal such as a stainless steel plate or a brass plate which covers peripheral portions of the lamp 2. The reflector 8 may comprise a light reflecting surface made of a material such as Ag or Al which has a high reflectance. The reflector 8 has an opening 8a on the incoming surface 11a side of the transparent light guide plate 11, and light from the lamp 2 is reflected by an inner peripheral surface of the reflector 8 so that all of the light of the lamp 2 is incident on the transparent light guide plate 11 from the opening 8a.

Preferably, the light guide plate 11 comprises an acrylic resin, for example, polymethylmethacrylate having a thickness between 2 and 3 mm, and is formed (e.g., only) of an acrylic resin of a high light transmissivity which is represented, for example, by polymethylmethacrylate (a refractive index of 1.49 and a critical reflection angle of 42°) and specifically an acrylic-based monomer or comonomer. Some light guide plates contain titanium oxide ($TiO_2$) to scatter light, but the transparent light guide plate 11 according to this embodiment does not contains $TiO_2$ or if it does, the content is desirably less than 0.1 volume %.

The transparent light guide plate 11 comprises an incoming surface 11a on which light from the lamp 2 is incident, an outgoing surface 11b from which the light incident on the incoming surface 11a is emitted to an exterior, and an opposed surface (opposite surface) 11c opposed to the outgoing surface 11b. An edge portion E is present between the incoming surface 11a and the outgoing surface 11b and between the incoming surface 11a and the opposed surface 11c.

For diffused reflection, the opposed surface 11c of the transparent light guide plate 11 preferably has, for example, dot-like printing applied thereto, which reflects light. In addition, the transparent light guide plate 11 may be shaped like a plate having a uniform thickness from the incoming surface 11a side to the other end side, but it is preferably formed to be gradually thinner from the incoming surface 11a side to the other end side in order to improve the light diffusion.

The incoming surface 11a of the transparent light guide plate 11 is a smooth surface (machined surface) S formed by means of machining. The incoming surface 11a comprising the smooth surface S preferably has a radius of curvature or a chamfer dimension of 140 [$\mu$m] or smaller in at least one (desirably both) of the edge portion E on the outgoing surface 11b side and the edge position E on the opposed surface 11c side. By forming the incoming surface 11a into the smooth surface S in this manner, the edge portion E is reproduced into a designed shape. At least one (desirably both) of the edge portions E may have a radius of curvature or a chamfer dimension of 10 [$\mu$m] or more.

To manufacture the transparent light guide plate 11 including the incoming surface 11a comprising the smooth surface S as described above, a light guide plate material 110 is obtained by means of injection molding at an injection molding step, and a surface 11a of the light guide plate material 110 which constitutes the incoming surface 11a is machined using, for example, an end mill or a milling cutter, as shown in FIG. 4a. As shown in FIG. 4b, the smooth surface S formed on the incoming surface 11a by means of such machining should have machining traces observed using a microscope or the like, the traces being created by the tool used for machining.

Figure 5:
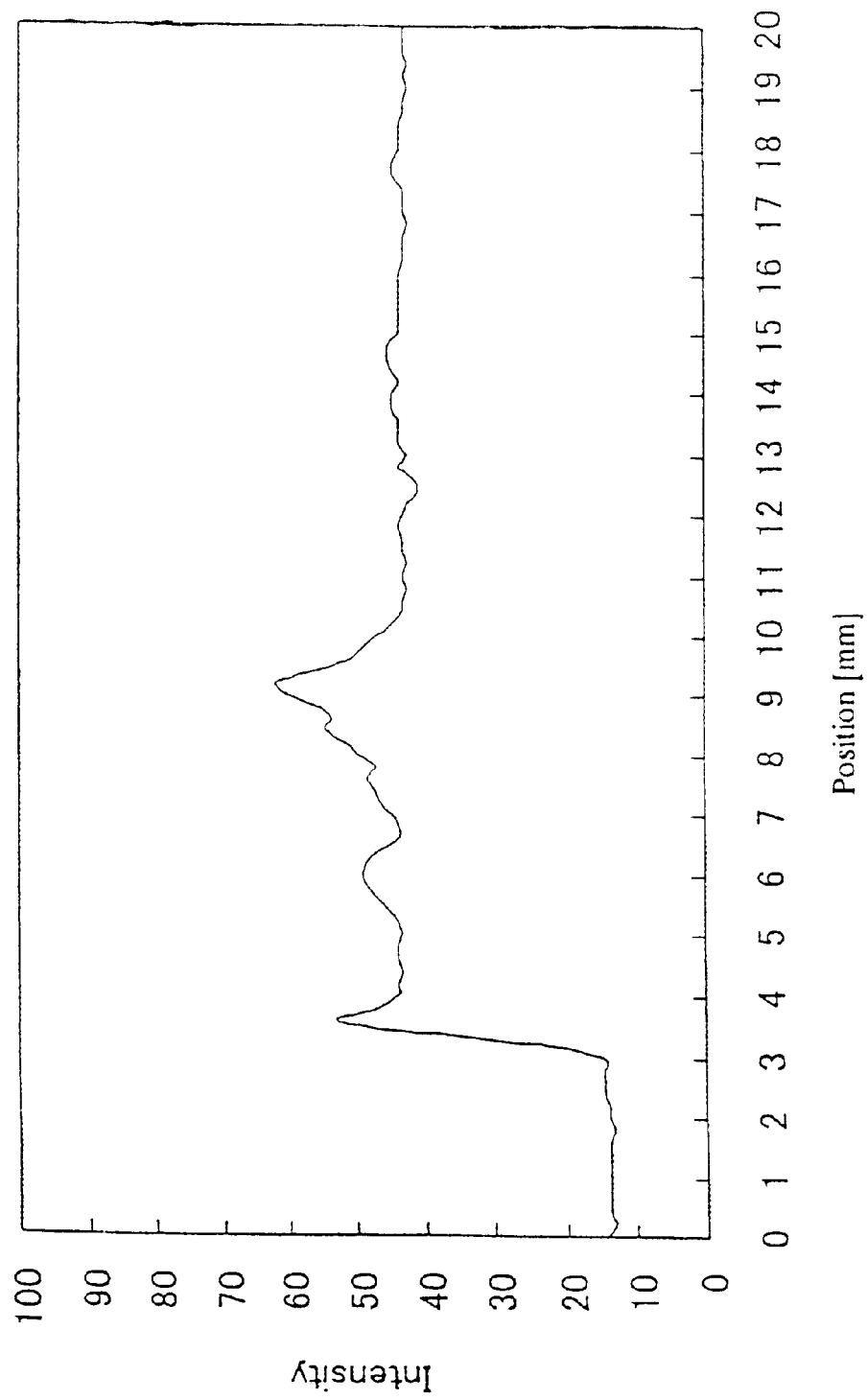
FIG. 5 is a chart showing how bright lines occur in the light guide plate.
Figure 17:
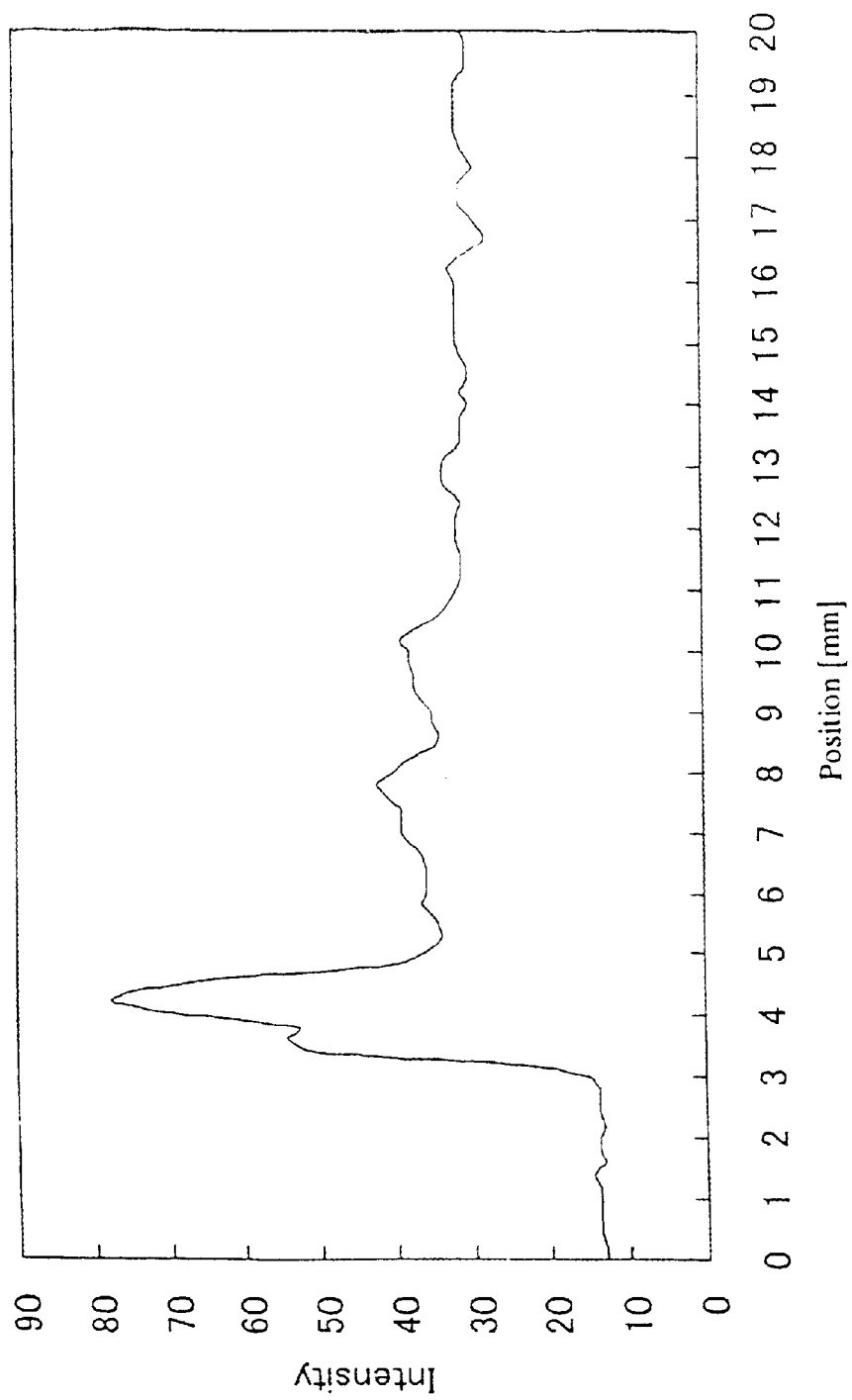
FIG. 17 is a view showing how bright lines occur in a liquid crystal display comprising the light guide plate.

Thus, the transparent light guide plate 11 manufactured under the above described conditions was actually combined with the diffusion sheet 5, the prism sheet 12, and the like to produce a liquid crystal display, and the luminance on a screen was measured in the same manner as in FIG. 17. FIG. 5 shows the results of measurements, where the axis of abscissa indicates the position (distance) on the screen relative to the lamp (2) side, while the axis of ordinate indicates the integrated value of the amount of light emitted. As is apparent from the results of the measurements, a decrease in a periodic occurrence of bright lines was observed in the actual liquid crystal display.

Figure 6:
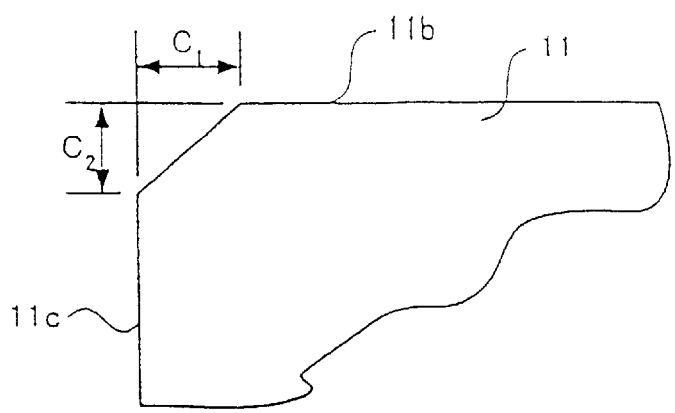
FIG. 6 is a view showing a chamfer dimension of the light guide plate.
Figure 7:
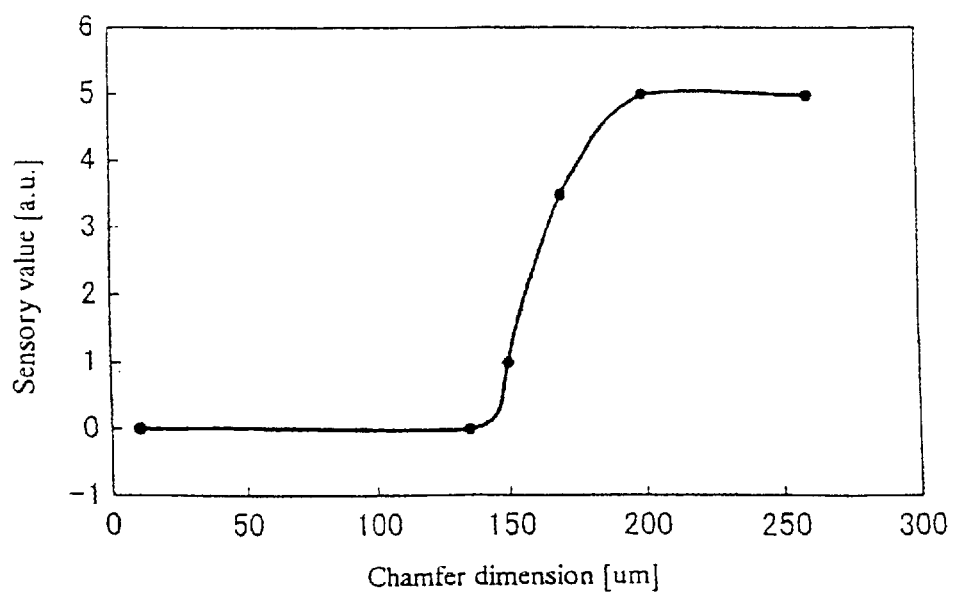
FIG. 7 is a chart showing results of sensory inspections using the light guide plate as well as the relationship between the chamfer dimension and occurrence of bright lines.

Furthermore, the transparent light guide plate 11 formed as described above was subjected to sensory inspections for the occurrence of bright lines by varying the chamfer dimension. As shown in FIG. 6, the transparent light guide plates 11 was produced by varying the chamfer dimension $C_1$, $C_2$ of the edge portion E among 10, 135, 150, 170, 200, and 260 [$\mu$m], and were each integrated into the liquid crystal display with the diffusion sheet 5, the prism sheet 12, the prism protective sheet 7, the reflection sheet 4, and the like. Then, the occurrence of bright lines on the screen was observed. After the observation, the intensity level of the bright lines was evaluated as five sensory values including 0 (no bright line was observed), 1, 2, . . . 5 (significant bright lines were observed) (two subjects were used). FIG. 7 shows the results, indicating that fewer bright lines occurred when the chamfer dimension $C_1$, $C_2$ was 200 [$\mu$m] or smaller and that no bright line was observed at 140 [$\mu$m] or smaller.

Figure 8:
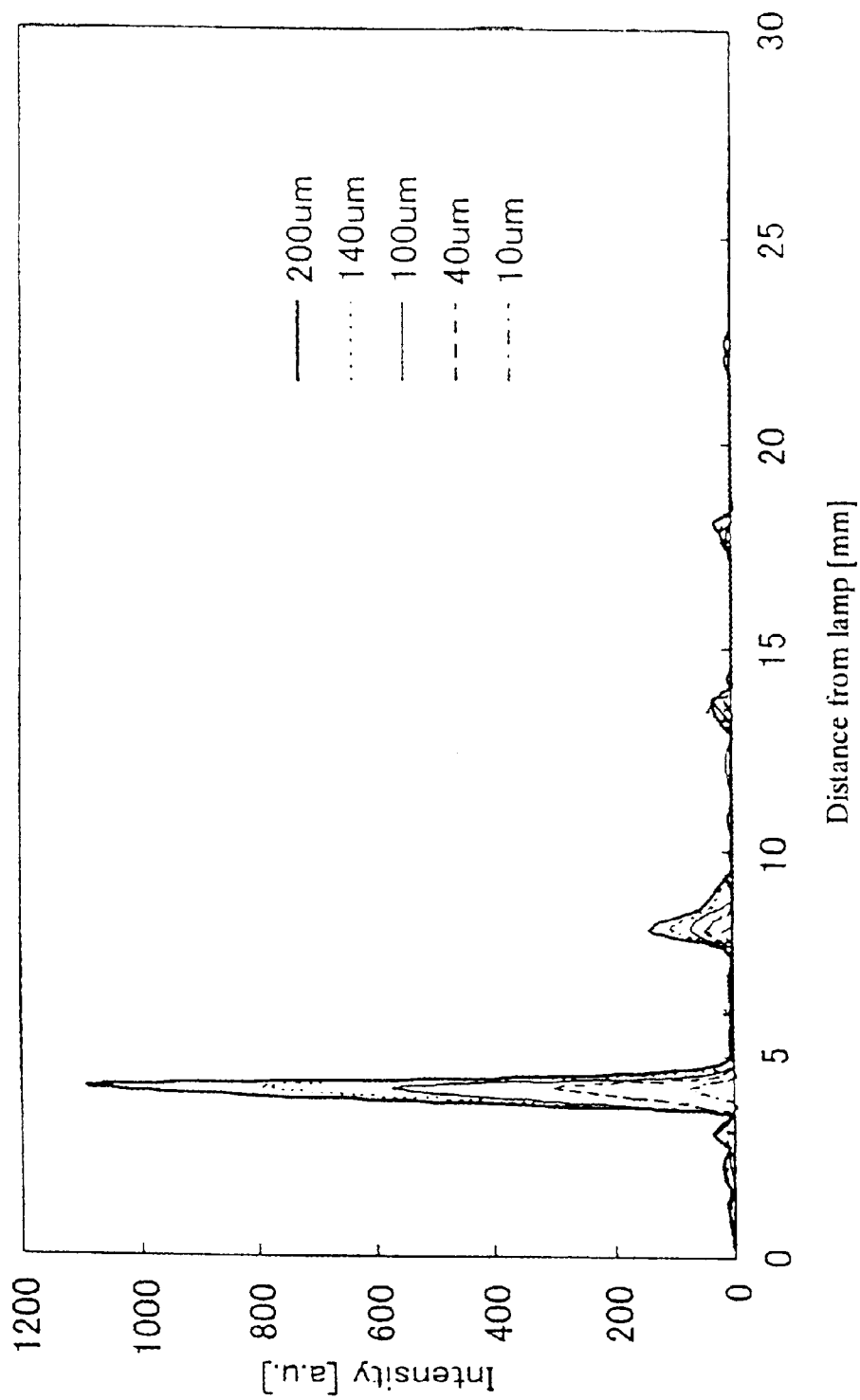
FIG. 8 is a chart showing results of tests using the light guide plate as well as the relationship between a distance from a lamp and bright line intensity observed when the chamfer dimension was varied.
Figure 9:
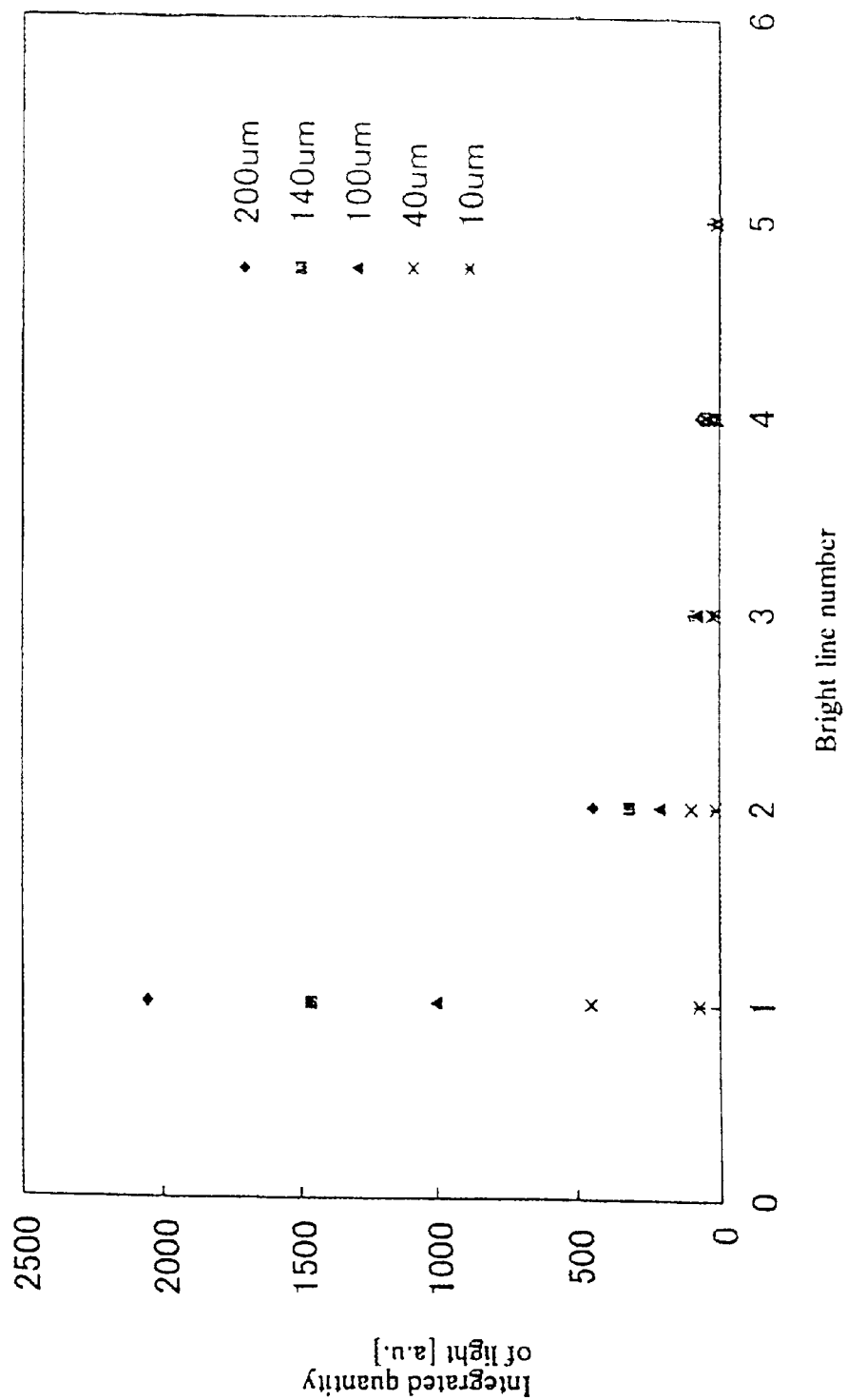
FIG. 9 is a chart showing the intensity of each bright line that occurred when the chamfer dimension was varied.
Figure 10:
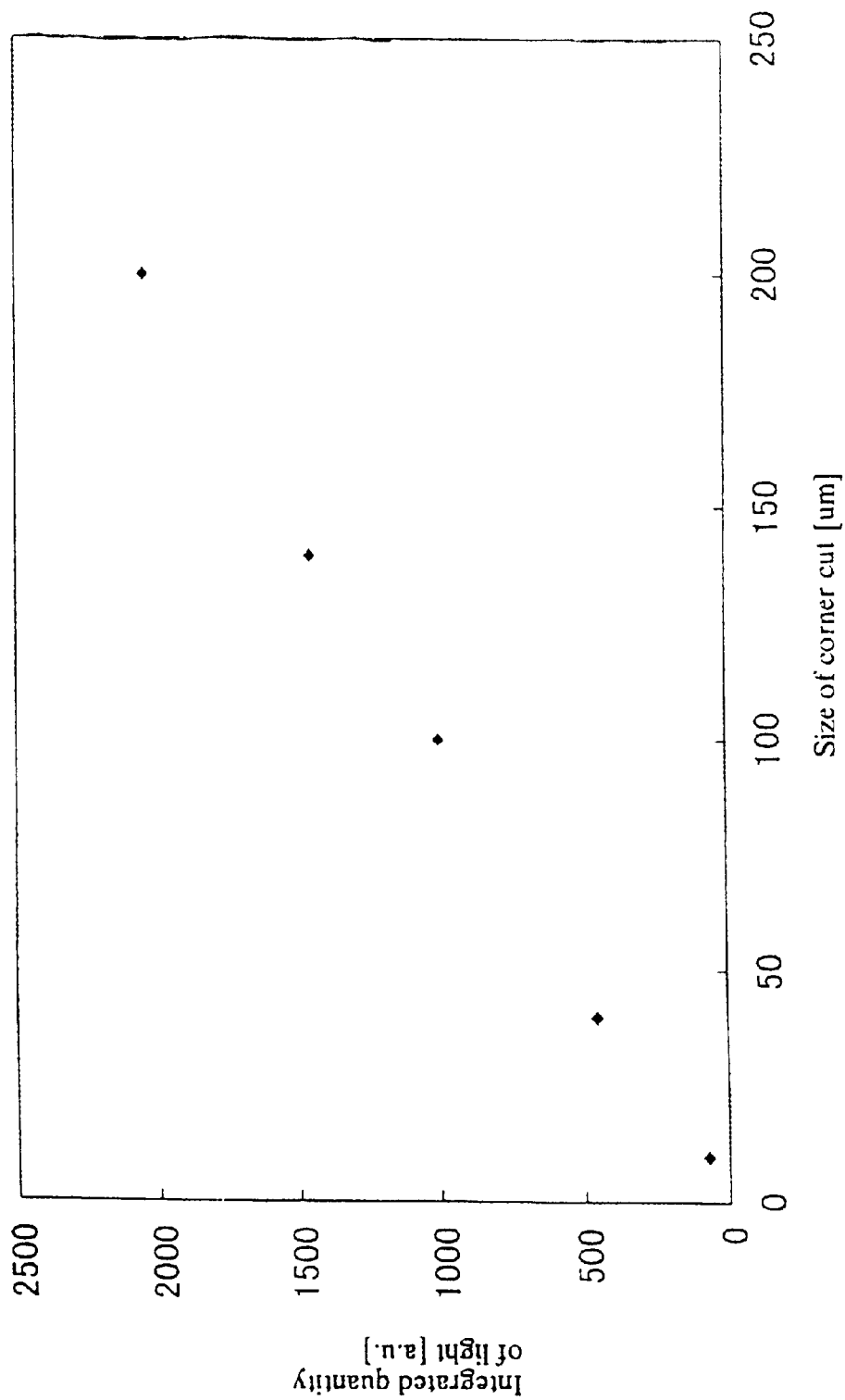
FIG. 10 is a chart showing the intensity of a first light line measured when the chamfer dimension was varied.

The intensity of the bright lines was actually measured under each of the conditions used for the sensory inspections. FIGS. 8 to 10 show the results, and FIG. 8 is a chart showing the relationship between the bright line intensity and the distance from the lamp 2 for each chamfer dimension $C_1$, $C_2$. Additionally, FIG. 9 is a chart showing the intensity of the resulting bright lines, which are numbered 1, 2, . . . 6 starting with the one closest to the lamp 2, the intensity being plotted for each chamfer dimension $C_1$, $C_2$. In addition, FIG. 10 shows a relationship between the chamfer dimension $C_1$, $C_2$ and the intensity of the bright line at the first bright line in FIG. 9, where the relationship is plotted. These charts indicate that the chamfer dimension $C_1$, $C_2$ and the bright line intensity have a substantially linear relationship and that the intensity of the resulting bright lines decreases linearly with the chamfer dimension $C_1$, $C_2$.

However, the occurrence of the bright lines as is actually viewed by human beings is as shown by the results of the sensory inspections in FIG. 7; namely, fewer bright lines occurred when the chamfer dimension $C_1$, $C_2$ was 200 [$\mu$m] or smaller and that no bright line was observed at 140 [$\mu$m] or smaller.

In this manner, the occurrence of bright lines decreases when the edge portion E of the smooth surface S obtained by cutting the incoming surface 11a of the transparent light guide plate 11 has an upper limit on the radius of curvature or the chamfer dimension which is equal to 140 [$\mu$m] or smaller.

Figure 11:
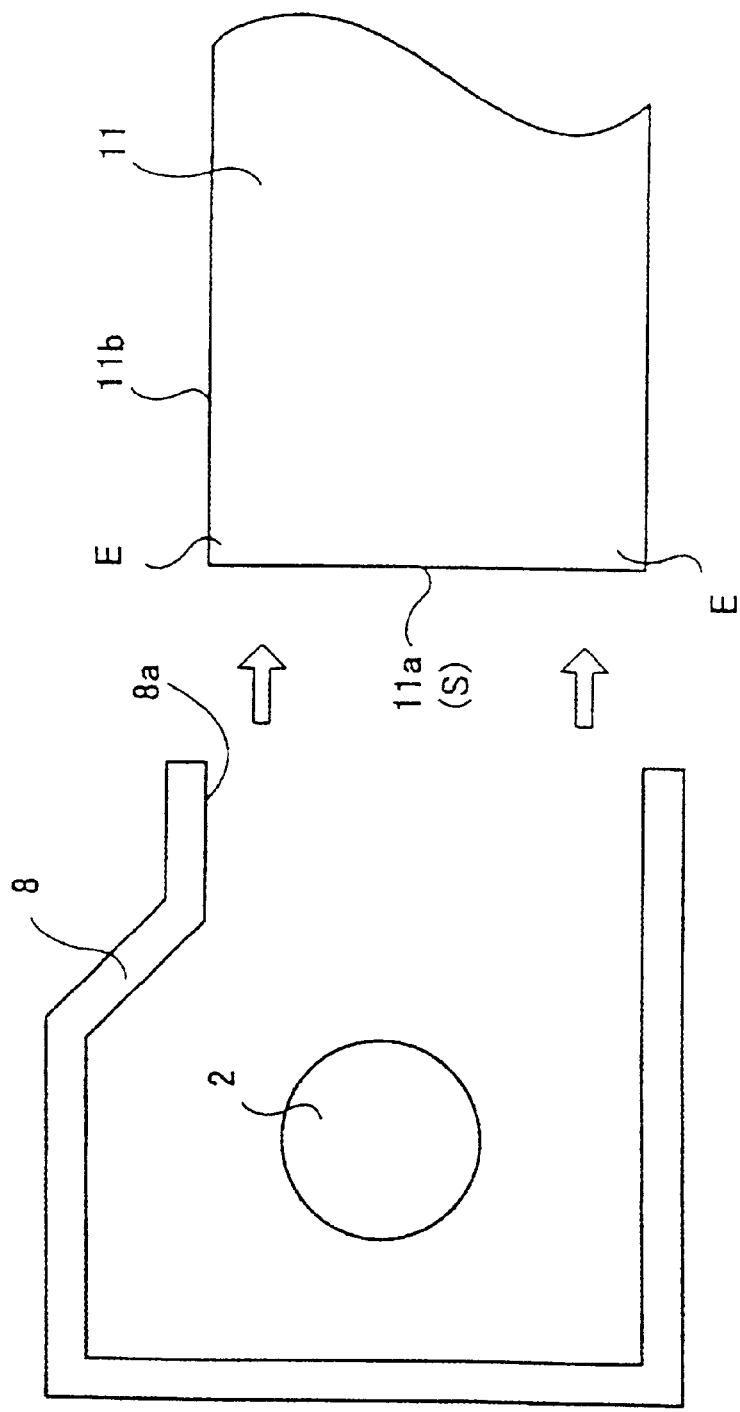
FIG. 11 is a view showing how the light guide plate is installed on a reflector.

A lower limit on the radius of curvature or chamfer dimension of the edge portion E is preferably 10 [$\mu$m] as described above. This lower limit allows the transparent light guide plate 11 to be easily inserted into the opening 8a of the reflector 8 during assembly as shown in FIG. 11. If the radius of curvature or chamfer dimension of the edge portion E is, for example, smaller than 10 [$\mu$m], it forms what is called a sharp edge and may be caught when the transparent light guide plate 11 is inserted into the reflector 8, thereby preventing smooth operations or creating foreign matter such as burrs or the like.

As described above, by machining the incoming surface 11a of the transparent light guide plate 11 to form it into the smooth surface S, manufacturing tolerances during injection molding can be corrected to form the edge portion E into the designed shape. Then, by combining the transparent light guide plate 11 with the diffusion sheet 5 and the prism sheet 12 to constitute the back light unit 10, bright lines that may occur on the screen of the liquid crystal display can be reduced without the need to provide a light blocking member, a light blocking film, or the like at the edge position E of the transparent light guide plate 11 or in a neighborhood thereof. To effectively reduce the occurrence of bright lines, the edge portion E preferably has a radius of curvature or a chamfer dimension of 140 [$\mu$m] or smaller.

In addition, in the liquid crystal display, the upward prism sheet 12 is disposed on the front surface of the transparent light guide plate 11, and therefor it provides a diffusion effect to further significantly reduce bright lines.

In the above described embodiment, the transparent light guide plate 11 has its incoming surface 11a machined to form the smooth surface S and the edge portion E to have the predetermined radius of curvature or chamfer dimension, but other embodiments are possible as described below.

Figure 12A:
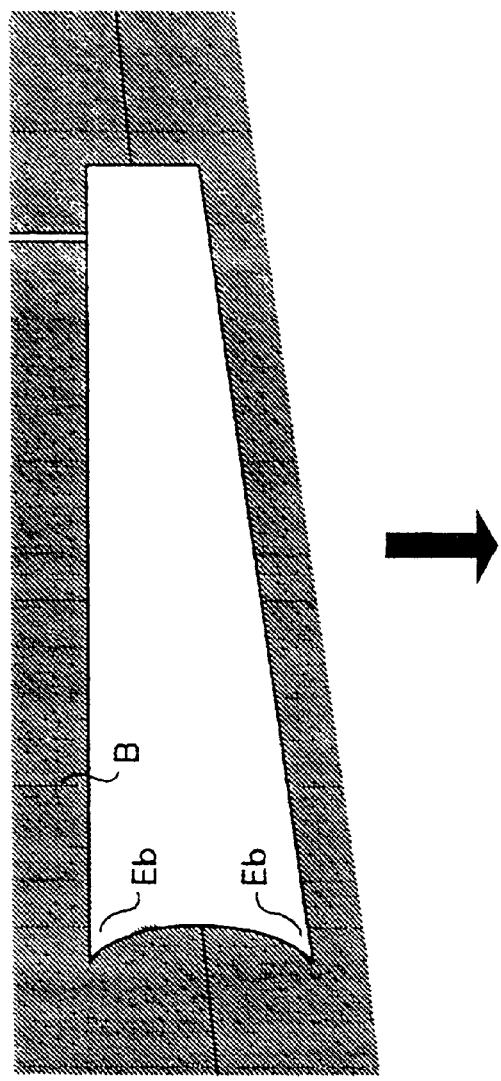
FIGS. 12a–12b are process diagrams showing a method for manufacturing a light guide plate according to another embodiment of the present invention.
Figure 12B:
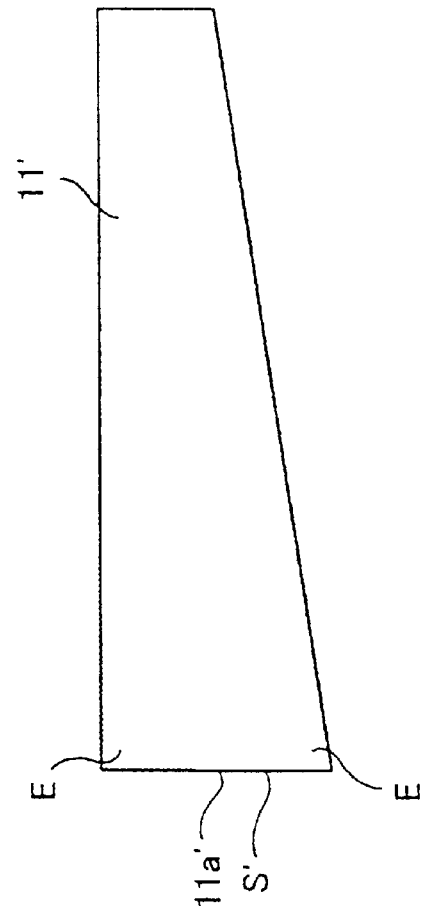
Figure 14:
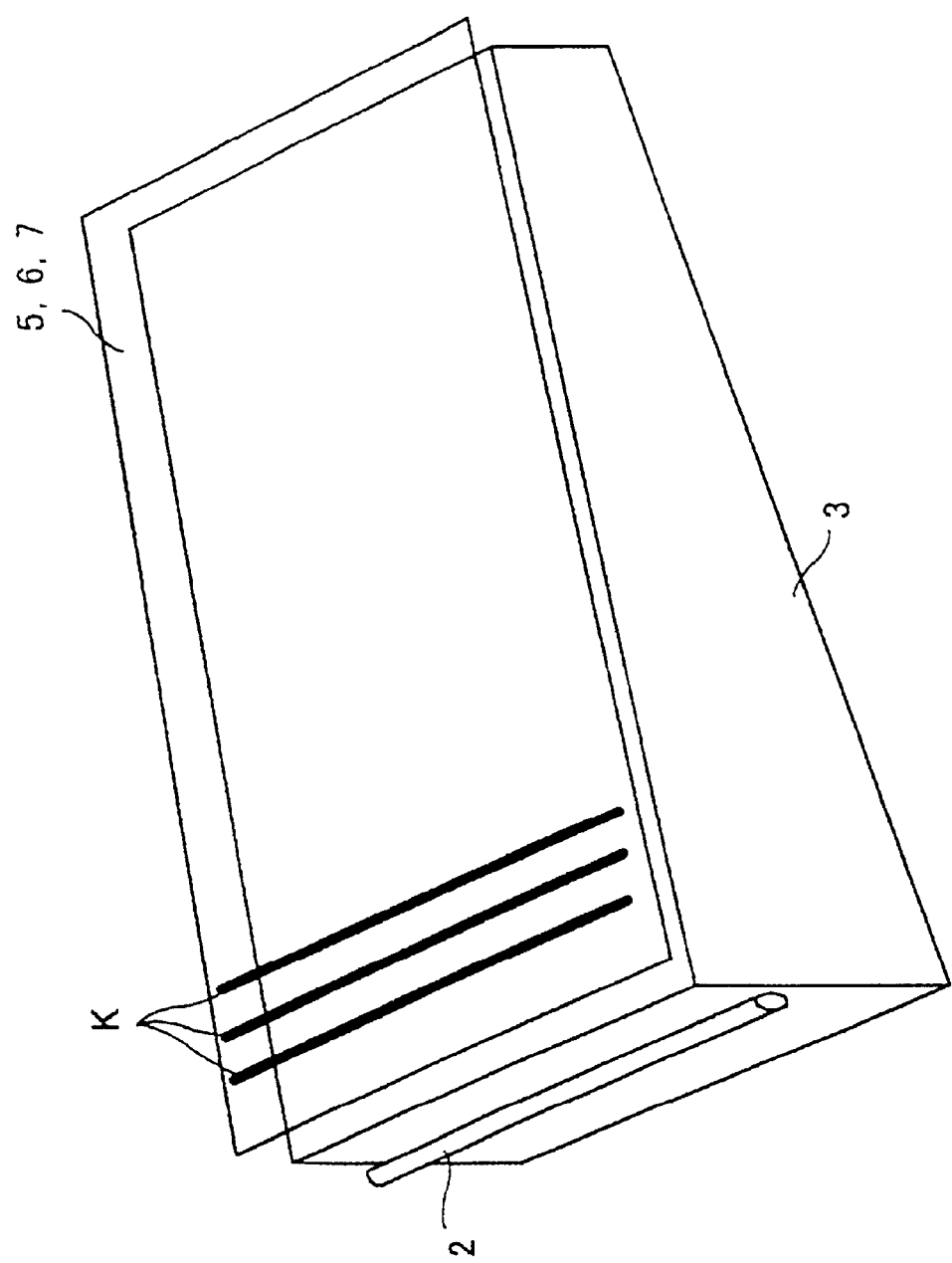
FIG. 14 is a perspective view showing how bright lines occur in the liquid crystal display.
Figure 16:
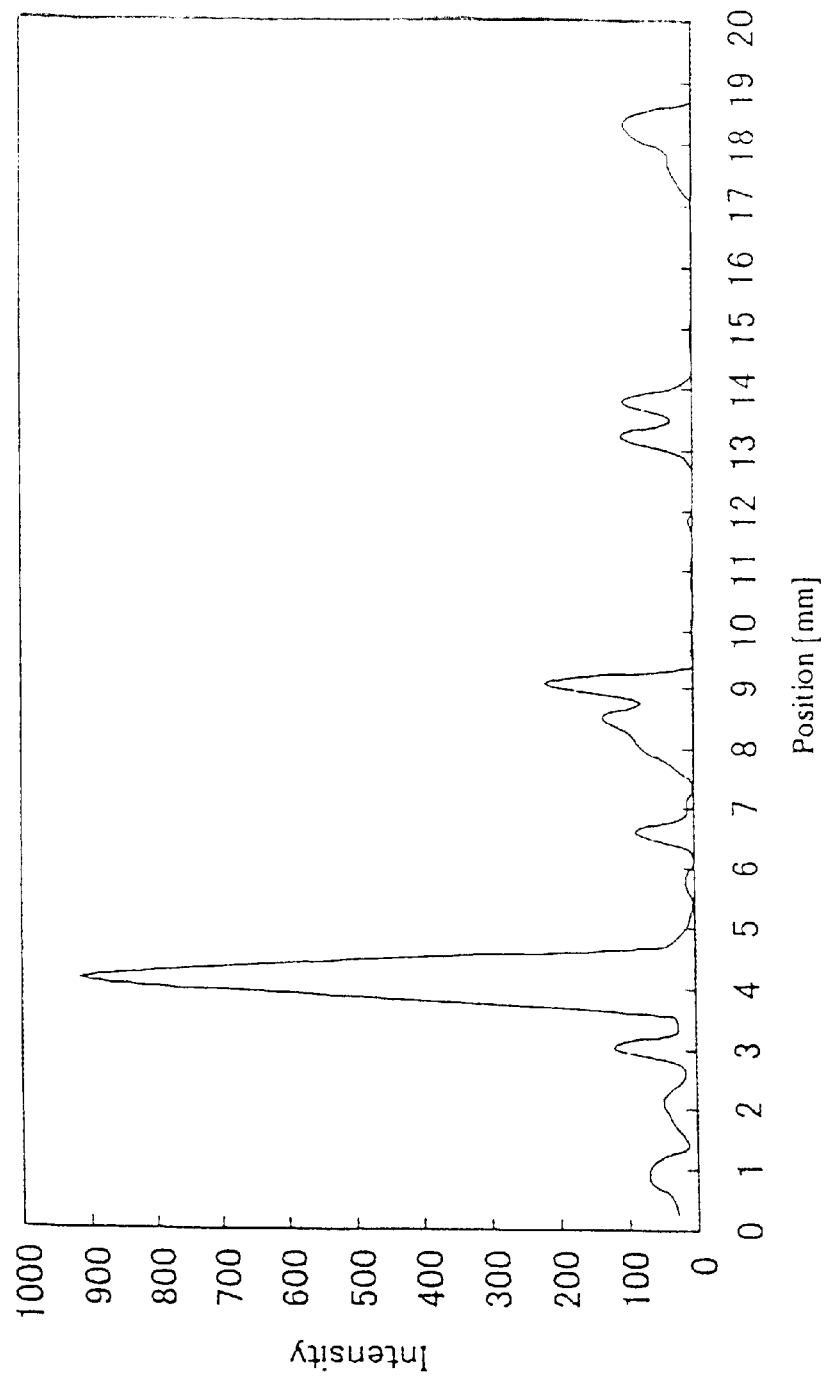
FIG. 16 is a chart showing results of the simulation.

That is, as shown in FIGS. 12a–12b, a transparent light guide plate 11' is molded, immediately after injection molding, to have the same shape as the transparent light guide plate 11 without no additional machining. That is, a molding die is designed and produced beforehand so that the transparent light guide plate 11' has, after molding, an incoming surface 11a' comprising a smooth surface S', with the edge portion E having the predetermined radius of curvature or chamfer dimension. To achieve this, the shape of an edge portion Eb of a die B may be set in advance taking into consideration molding short mold (generally about 0.6%) during cooling of the interior of the die and the occurrence of "short mold" in the die resulting from the filling capability of the resin material.

By using the die B designed as described above to carry out injection molding, the incoming surface 11a' comprises the smooth surface S' and the edge portion E has the predetermined radius of curvature or chamfer dimension immediately after the produced transparent light guide plate 11' has been injection-molded, thereby requiring no additional machining.

In the back light unit 10 and liquid crystal display using the transparent light guide plate 11' also serve to reduce the occurrence of bright lines similarly to the above described transparent light guide plate 11.

In the above described embodiments, the incoming surface 11a of the transparent light guide plate 11 is machined, for example, with an end mill, a milling cutter, or the like to form the smooth surface S, but the tool or machine tool used for this purpose is not limited. The smooth surface S may further be polished to eliminate burrs or machining traces originating from the machining, but every attention is to be paid because the edge portion E may be curled during the polishing.

In addition, although the above described embodiments illustrates only the transparent light guide plates 11, 11' as a light guide plate constituting a back light unit, the present invention is not limited to the transparent light guide plates. For example, the transparent light guide plate need not comprise only the acrylic-based monomer or comonomer but may contain another material, for example, 0.1 volume % or more of titanium oxide ($TiO_2$). In this case, however, the back light unit is also to be combined with the diffusion sheet 5 and the prism sheet 12.

In addition, only if the diffusion sheet 5, the prism sheet 12, or the like which acts as a bright line restraining sheet can restrain the occurrence of bright lines, the mounting structure of these sheets, the number of them, and their lamination order are not limited to those described above. Alternatively, materials other than those described above may be used for the bright line suppression sheets only if the bright line occurrence restraining effect is obtained.

Additionally, two lamp units 13 may be used instead of one in a fashion being disposed along two sides of the transparent light guide plate 11.

Besides the above, configurations other than the above description can be employed as appropriate without deviation from the principles of the present invention, and various combinations of the above described configurations can be used.

As described above, according to the present invention, by, for example, machining the incoming surface so that the edge portion of the light guide plate has a radius of curvature or a chamfer dimension within a predetermined dimensional range, light incident from the incoming surface of the light guide plate can be uniformly emitted from the outgoing surface. Furthermore, by combining the light guide plate with the bright line suppression sheet such as the diffusion sheet or the prism sheet, the occurrence of bright lines on the screen can be reduced.

What is claimed is:

1. A back light unit, comprising:
    a light guide plate for guiding light incident from an incoming surface thereof to an outgoing surface thereof to emit it as planar light;
    a reflection sheet located on a surface on the opposite side of said light guide plate to said outgoing surface;
    a diffusion sheet for diffusing said planar light from said outgoing surface of said light guide plate; and
    a prism sheet having a prism surface for partly returning the light emitted from said outgoing surface of said light guide plate, from said outgoing surface to an interior of said light guide plate for diffusion,
    wherein an edge portion between said incoming surface of said light guide plate and at least one of said outgoing surface and said opposite surface has a radius of curvature or a chamfer dimension of 140 $\mu$m or smaller extending continuously along substantially the entire length of said edge portion.

2. The back light unit according to claim 1, wherein said prism sheet has said prism surface on the opposite side thereof to said light guide plate.

3. The back light unit according to claim 1, wherein said edge portion of said light guide plate has a radius of curvature or a chamfer dimension of 10 $\mu$m or more.

4. A back light unit for guiding light from a light source to apply it to a liquid crystal panel as planar light, comprising:
    a light guide plate including an incoming surface on which light from said light source opposed to the light guide plate is incident and said incoming surface being formed of a machined surface along substantially the entire incoming surface, and an outgoing surface from which the light incident from said incoming surface is emitted as planar light;
    a sheet-shaped diffusion member having a diffusion member for diffusing light from said outgoing surface; and
    a sheet-shaped prism member having recesses and projections opposite to said light guide plate.

5. The back light unit according to claim 4, wherein an edge portion between said incoming surface of said light guide plate and said outgoing surface and between said incoming surface of said light guide plate and a surface opposed to said outgoing surface has a radius of curvature or a chamfer dimension of 140 $\mu$m or smaller.

6. A liquid crystal display, comprising a liquid crystal display panel for displaying images and a back light unit provided on a rear surface of said liquid crystal display panel for irradiating the liquid crystal display panel with light, wherein said back light unit comprises:
    a light source for emitting light;
    a light guide plate having an incoming surface opposed to said light source and an outgoing surface facing said liquid crystal display panel and in which an edge portion between said incoming surface and said outgoing surface and between said incoming surface and a surface opposed to said outgoing surface has a radius of curvature or a chamfer dimension of 140 $\mu$m or smaller extending continuously along substantially the entire length of said edge portion; and
    a bright line suppression sheet for restricting occurrence of bright lines caused by planar light emitted from said outgoing surface of said light guide plate.

7. The liquid crystal display according to claim 6, wherein said incoming surface of said light guide plate is machined.

* * * * *